(12) United States Patent
Munro

(10) Patent No.: US 10,295,116 B2
(45) Date of Patent: May 21, 2019

(54) CLAMPING ARRANGEMENT

(71) Applicant: ALPHASTRUT LTD, Edinburgh Lothian (GB)

(72) Inventor: Andrew Munro, Auchterarder (GB)

(73) Assignee: ALPHASTRUT LTD, Edinburgh (GB)

( * ) Notice: Subject to any disclaimer, the term of this patent is extended or adjusted under 35 U.S.C. 154(b) by 0 days.

(21) Appl. No.: 15/513,142

(22) PCT Filed: Sep. 22, 2015

(86) PCT No.: PCT/GB2015/052743
§ 371 (c)(1),
(2) Date: Mar. 21, 2017

(87) PCT Pub. No.: WO2016/046538
PCT Pub. Date: Mar. 31, 2016

(65) Prior Publication Data
US 2017/0241588 A1 Aug. 24, 2017

(30) Foreign Application Priority Data
Sep. 23, 2014 (GB) ...................................... 1416798

(51) Int. Cl.
*F16B 2/12* (2006.01)
*F16L 3/24* (2006.01)
(Continued)

(52) U.S. Cl.
CPC .............. *F16M 13/022* (2013.01); *E04B 9/26* (2013.01); *F16B 2/12* (2013.01); *F16L 3/24* (2013.01);
(Continued)

(58) Field of Classification Search
CPC ......... Y10T 24/44598; Y10T 24/44974; F16L 3/24; F16L 3/26; F16M 13/022;
(Continued)

(56) References Cited

U.S. PATENT DOCUMENTS 705,984 A * 7/1902 Wellington ............... F16L 3/24
248/72
802,103 A * 10/1905 Houghton ................. F16L 3/24
248/68.1

(Continued)

FOREIGN PATENT DOCUMENTS

GB 855948 12/1960
JP H07150675 6/1995

*Primary Examiner* — Ingrid M Weinhold
(74) *Attorney, Agent, or Firm* — Liu & Liu

(57) ABSTRACT

The present invention relates to a clamping arrangement (24) for attaching a structural component (22) to a structural member. The structural member comprises a planar part (18) defined between two substantially parallel faces and a bulb (20) on one side only of the planar part, the bulb defining a sole surface (32) substantially orthogonal to the planar part, an oblique surface (34) and a rounded surface (36) between the sole surface and the oblique surface. The clamping arrangement (24) comprises a first clamping part (38) configured to abut against the face of the planar part directed away from the bulband to extend underneath the sole surface. The clamping arrangement (24) also comprises a second clamping part (40) defining an oblique surface which abuts against the oblique surface of the bulb. The clamping arrangement (24) further comprises an actuating arrangement (42) configured to urge the first and second clamping parts towards each other in a direction substantially orthogonal to the planar part and thereby clamp the structural member therebetween.

20 Claims, 3 Drawing Sheets

(51) Int. Cl.
 *F16M 13/02* (2006.01)
 *E04B 9/26* (2006.01)
 *F16L 3/26* (2006.01)
 *H02G 3/04* (2006.01)
 *E04B 9/00* (2006.01)
 *F16B 2/06* (2006.01)

(52) U.S. Cl.
 CPC .............. *F16L 3/26* (2013.01); *H02G 3/0456* (2013.01); *E04B 9/006* (2013.01); *F16B 2/065* (2013.01)

(58) Field of Classification Search
 CPC .......... F16B 2/12; F16B 7/0493; F16B 2/065; E04B 1/40; E04B 9/26; E04B 9/006; H02G 3/0456
 USPC ....... 248/72, 228.5, 228.3, 228.1, 228.4, 58, 248/62, 67.5, 229.12, 229.14, 229.22, 248/229.24, 231.21, 231.41, 231.61; 52/39, 126.6, 846
 See application file for complete search history.

(56) References Cited

U.S. PATENT DOCUMENTS

| | | | | |
|---|---|---|---|---|
| 982,965 A * | 1/1911 | Johnson | ................... | F16L 3/24 16/425 |
| 1,516,489 A * | 11/1924 | Barton | ..................... | B60R 9/00 24/523 |
| 1,568,122 A * | 1/1926 | Zifferer | ..................... | E04B 9/18 248/228.2 |
| 1,586,061 A * | 5/1926 | Barton | ..................... | B60R 9/00 24/343 |
| 1,587,089 A * | 6/1926 | Moodie | ..................... | E04B 1/40 248/228.1 |
| 2,359,146 A * | 9/1944 | Opie | ........................ | B66C 1/64 24/489 |
| 2,868,485 A * | 1/1959 | Friel | ........................ | F16L 3/24 248/59 |
| 2,954,200 A * | 9/1960 | Gannon | ................... | F16L 3/24 24/370 |
| 2,961,270 A * | 11/1960 | Renfroe | ................... | E04B 1/40 248/228.5 |
| 3,039,161 A * | 6/1962 | Gagnon | ................. | F16B 2/065 24/490 |
| 3,469,810 A * | 9/1969 | Dorris | ...................... | F16B 2/12 24/525 |
| 4,866,797 A * | 9/1989 | Vollan | ................ | E04B 1/34352 52/126.6 |
| 7,997,839 B1 * | 8/2011 | Gallegos | .................. | B60R 7/08 248/231.61 |
| 2016/0138634 A1* | 5/2016 | Zhang | ..................... | E04B 1/40 52/698 |

* cited by examiner

CLAMPING ARRANGEMENT

FIELD OF THE INVENTION

The present invention relates to a clamping arrangement for attaching a structural component, such as is comprised in utility support apparatus, to a structural member, such as a beam. The present invention also relates to utility support apparatus configured to be clamped to at least one structural member, such as a beam.

BACKGROUND ART

It is known to support utility distribution elements, such as cables or ducts, within buildings and other constructions by way of utility support apparatus. The utility support apparatus typically comprises a tray which carries the utility distribution elements with the utility support apparatus being attached to a soffit such that the tray is suspended from the soffit. Where aesthetics are of concern, the utility support apparatus is enclosed between the soffit and a false ceiling.

The means by which the utility support apparatus is suspended from the soffit depends on the form of the soffit. Where the utility support apparatus is suspended from a feature of large area, such as a floor or ceiling, the feature may be reinforced by one or more structural members such as beams. The beams may, for example, be spaced apart and extend from one side of the feature to the other side of the feature. The beams therefore may provide convenient and perhaps also appropriate locations for suspension of utility support apparatus. Where a distal end of a beam comprises a planar portion which extends perpendicularly to a downwardly extending main planar part, the utility support apparatus may be attached thereto by way of a known beam clamp arrangement.

Certain forms of beam comprise a bulb at their distal ends instead of a perpendicularly extending planar portion. The present inventor has become appreciative of difficulties in attaching the like of utility support apparatus to such beams on account of the shape of the bulb. The present invention has been devised in the light of the inventor's appreciation of such shortcomings. It is therefore an object for the present invention to provide an improved clamping arrangement for attaching a structural component to a structural member, such as a beam, having a bulb. It is a further object for the present invention to provide improved utility support apparatus configured to be attached to at least one structural member, such as a beam, having a bulb.

STATEMENT OF INVENTION

According to a first aspect of the present invention there is provided a clamping arrangement for attaching a structural component to a structural member, such as a beam, the structural member comprising a planar part defined between two substantially parallel faces and a bulb on one side only of the planar part, the bulb defining a sole surface substantially perpendicular to the planar part, an oblique surface and a rounded surface between the sole surface and the oblique surface, the clamping arrangement comprising:
 a first clamping part configured to abut against the face of the planar part directed away from the bulb and to extend underneath the sole surface;
 a second clamping part defining an oblique surface which abuts against the oblique surface of the bulb; and
 an actuating arrangement configured to urge the first and second clamping parts towards each other in a direction substantially perpendicular to the planar part and thereby clamp the structural member therebetween.

The clamping arrangement is brought into use by disposing the first and second clamping parts in relation to each other on opposite sides of the structural member. The structural member comprises a planar part defined between two substantially parallel faces and a bulb on one side only of the planar part. The bulb may therefore extend from only one of the two substantially parallel faces defining the planar part. The bulb may be located towards a distal end of the planar part. The bulb defines a sole surface substantially perpendicular to the planar part, an oblique surface and a rounded surface between the sole surface and the oblique surface. The first and second parts are then urged towards each other by way of the actuating arrangement whereby the first clamping part abuts against the face of the planar part directed away from the bulb and an oblique surface of the second clamping part abuts against the oblique surface of the bulb to thereby clamp the structural member between the first and second clamping parts.

The clamping arrangement may be configured for actuation of the actuating arrangement to allow for movement apart of the first and second clamping parts whereby the structural member and clamping arrangement may be disengaged from each other. The clamping arrangement may thus provide for releasable clamping of the structural member.

The clamping arrangement may be configured for progressive movement of the first and second clamping parts in relation to each other. The actuating arrangement may comprise first and second actuating parts which move progressively in relation to each other to thereby provide for progressive movement of the first and second clamping parts in relation to each other. The actuating arrangement may comprise a threaded arrangement to provide for progressive movement.

The clamping arrangement may be configured such that the actuating arrangement is not attached and more specifically immovably attached to the first and second clamping parts. The actuating arrangement may be therefore an arrangement apart from the first and second clamping parts. Nevertheless the actuating arrangement may mechanically engage with each of the first and second clamping parts by bearing against the first and second clamping parts despite not being attached to them.

The actuating arrangement may extend in a direction substantially perpendicular to the planar part. The actuating arrangement may extend below the sole surface of the bulb and more specifically substantially parallel to the sole surface. The actuating arrangement may extend between the sole surface of the bulb and a surface of a member of the first clamping part that extends underneath the sole surface.

The actuating arrangement may extend from the side of the planar part comprising the bulb to the face of the planar part directed away from the bulb whereby the first and second clamping parts may be urged towards each other in a direction substantially perpendicular to the planar part.

The actuating arrangement may comprise at least one threaded arrangement. The threaded arrangement may comprise an elongate member which is threaded along at least a part of its length. The elongate member may comprise a flange which, in use, abuts against one of the first and second clamping parts. The threaded arrangement may comprise a threaded fastener, such as a nut, which threadedly engages with a threaded part of the elongate member. The nut or perhaps a washer disposed so as to abut against the nut may, in use, bear against one of the first and second clamping parts. The first and second clamping parts may therefore be urged together by way of each of the nut and the flange bearing against a respect one of the first and second clamping parts. As mentioned above, the actuating arrangement may not be immovably attached to either one of the first and second clamping parts.

The at least one threaded arrangement may extend from the side of the planar part comprising the bulb to the face of the planar part directed away from the bulb. More specifically the actuating arrangement may comprise two threaded arrangements. The two threaded arrangements may be spaced apart from each other in a direction along a length of the planar part and more specifically substantially perpendicularly to a direction between proximal and distal ends of the planar part.

The first and second clamping parts may be separate. The clamping arrangement may be configured such that each of the first and second clamping parts is moved bodily by way of the actuating arrangement. Each of the first and second clamping parts may be substantially rigid.

The actuating arrangement may be configured to mechanically engage with each of the first and second parts. More specifically the actuating arrangement may mechanically engage with the first and second parts on opposite sides of the structural member. The actuating arrangement may be configured to mechanically engage with each of the first and second clamping parts by way of an aperture and more specifically a bore defined by the clamping part. The actuating arrangement may therefore be received in a bore comprised in each of the first and second clamping parts.

The first clamping part may be configured to extend substantially parallel to the sole surface. The first clamping part may comprise first and second members which extend in substantially perpendicular directions. The first member may define a surface that abuts against the face of the planar part directed away from the bulb. The first member may be planar. The second member may extend underneath and more specifically substantially parallel to the sole surface. The second member may be planar. The first and second members may join at adjacent edges. The first clamping part may be integrally formed. More specifically the first clamping part may be formed from sheet material. Each of the first and second members may be formed by shaping of the sheet material. The first clamping part may be formed from a metal, such as aluminium or steel. The first clamping part may be integrally formed, such as by extrusion or casting.

The first and second clamping parts may be configured such that a distal edge of the second member of the first clamping part bears against the second clamping part when the structural member is clamped between the first and second clamping parts.

The second clamping part may define a planar surface and a rounded surface between the planar surface and the oblique surface. The rounded surface of the second clamping part may abut against part of the rounded surface of the bulb, such as a part adjacent to the oblique surface. The actuating arrangement may engage with the part of the second clamping part which defines the planar surface such as by way of a bore defined in the part of the second clamping part which defines the planar surface. The second clamping part may comprise a lip which extends from the part of the second clamping part which defines the oblique surface and more specifically from the end of the oblique surface other than the end adjacent the rounded surface. The lip may be planar. The lip may extend in a direction parallel to the planar part of the structural member. The lip may extend in a direction parallel to the planar surface of the second clamping part.

The second clamping part may comprise first and second members. The first member may define the oblique surface. The second member may extend away from the first clamping part when the structural member is clamped between the first and second clamping parts. The second member may be planar. The second member of the second clamping part may extend in a direction substantially perpendicular to the planar part. Where the first member of the second clamping part defines a planar surface, the second member of the second clamping part may extend in a direction substantially perpendicular to the planar surface. Where the first clamping part comprises a second member, the second member of the second clamping part and the second member of the first clamping part may lie in substantially the same plane when the structural member is clamped between the first and second clamping parts. More specifically a surface of the second member of the second clamping part and a surface of the second member of the first clamping part which are oriented away from a structural member clamped between the first and second clamping parts may lie in substantially the same plane. The first and second members may join at adjacent edges. The first clamping part may be integrally formed. More specifically the first clamping part may be formed from sheet material. Each of the first and second members may therefore be formed by shaping of sheet material. The second clamping part may be formed from a metal, such as aluminium or steel. The second clamping part may be integrally formed, such as by extrusion or casting.

The clamping arrangement may be configured to be coupled to and perhaps releasably coupled to a structural component. The second clamping part may be configured to be coupled to and perhaps releasably coupled to a structural component. The clamping arrangement may comprise an attachment arrangement which is configured to couple the second clamping arrangement to the structural component. The attachment arrangement may be configured to mechanically engage with each of the second clamping part and the structural component. The attachment arrangement may comprise at least one threaded arrangement which engages mechanically with each of the second clamping part and the structural component. More specifically the threaded arrangement may comprise an elongate member which is threaded along at least part of its length. The second clamping part may define a bore which is configured to receive the elongate member therethrough. The bore may be defined in the second member of the second clamping part whereby the elongate member engages mechanically with the second member of the second clamping part.

The elongate member may extend in a direction substantially parallel to the planar part of the structural member and more specifically substantially parallel to a direction between proximal and distal ends of the planar part. The attachment arrangement may comprise at least one threaded fastener, such as a nut, which threadedly engages with the elongate member. The threaded fastener may engage with the elongate member such that the second clamping part is between the threaded fastener and the structural component. The attachment arrangement may comprise two threaded arrangements. The two threaded arrangements may be spaced apart from each other in a direction parallel to a length of the planar part of the structural member. Elongate members of the two spaced apart attachment arrangements may be joined by an elongate portion which extends substantially perpendicularly to the elongate members. In use, the structural member may be received between the two elongate members and borne upon the elongate portion. The attachment arrangement may thus be shaped to support the structural component.

According to a second aspect of the present invention there is provided a structural arrangement comprising a structural member, such as a beam, and a clamping arrangement according to the first aspect of the present invention. As described above, the clamping arrangement may clamp and perhaps releasably clamp to the structural member. The structural member may be a beam, such as a beam formed of metal such as aluminium or steel. The structural member may reinforce a structure such as a floor or ceiling.

Further embodiments of the second aspect of the present invention may comprise one or more features of the first aspect of the present invention.

The structural component may be comprised in utility support apparatus. The utility support apparatus may be of modular form. The utility support apparatus may comprise parts formed from a metal such as aluminium. The utility support apparatus may depend from a structure comprising the structural member to which the first and second clamping members are clamped. The utility support apparatus may be supported at each of plural locations. The utility support apparatus may therefore be so supported by plural clamping arrangements with each clamping arrangement engaging mechanically with a different part of the structure from which the utility support apparatus depends. For example the plural clamping arrangements may engage mechanically at spaced apart locations on a structural member or may engage mechanically with different structural members.

According to a third aspect of the present invention there is provided utility support apparatus comprising at least one clamping arrangement according to the first aspect of the present invention. As mentioned above, the utility support apparatus may be configured to depend from a structure. The structure may be a soffit comprised in a building or other construction. The soffit may be comprised in an overhead structure, such as a ceiling. Alternatively the soffit may be comprised in a floor structure and more specifically an under floor structure. The utility support apparatus may therefore be suspended underneath a floor structure.

Further embodiments of the third aspect of the present invention may comprise one or more features of the first or second aspect of the present invention.

According to a fourth aspect of the present invention there is provided a structure configured to form part of a construction, such as a building or an offshore oil or gas exploration or recovery facility, the structure comprising at least one clamping arrangement according to the first aspect of the present invention. The structure may be configured to form at least part of an overhead structure. Alternatively the structure may be configured to form at least part of a floor structure. The structure may be of modular form.

Further embodiments of the fourth aspect of the present invention may comprise one or more features of any previous aspect of the present invention.

According to a further aspect of the present invention there is provided a clamping arrangement for attaching a structural component to a structural member, such as a beam, the structural member comprising a planar part and a bulb on a side of the planar part, the bulb defining a sole surface substantially perpendicular to the planar part, an oblique surface and a rounded surface between the sole surface and the oblique surface, the clamping arrangement comprising: a first clamping part configured to abut against a face of the planar part directed away from the bulb; and a second clamping part defining an oblique surface which abuts against the oblique surface of the bulb, clamping arrangement being configured to urge the first and second clamping parts towards each other and thereby clamp the structural member therebetween. Embodiments of the further aspect of the present invention may comprise one or more features of any previous aspect of the present invention.

BRIEF DESCRIPTION OF DRAWINGS

Further features and advantages of the present invention will become apparent from the following specific description, which is given by way of example only and with reference to the accompanying drawings, in which.

DESCRIPTION OF EMBODIMENTS

Figure 1:
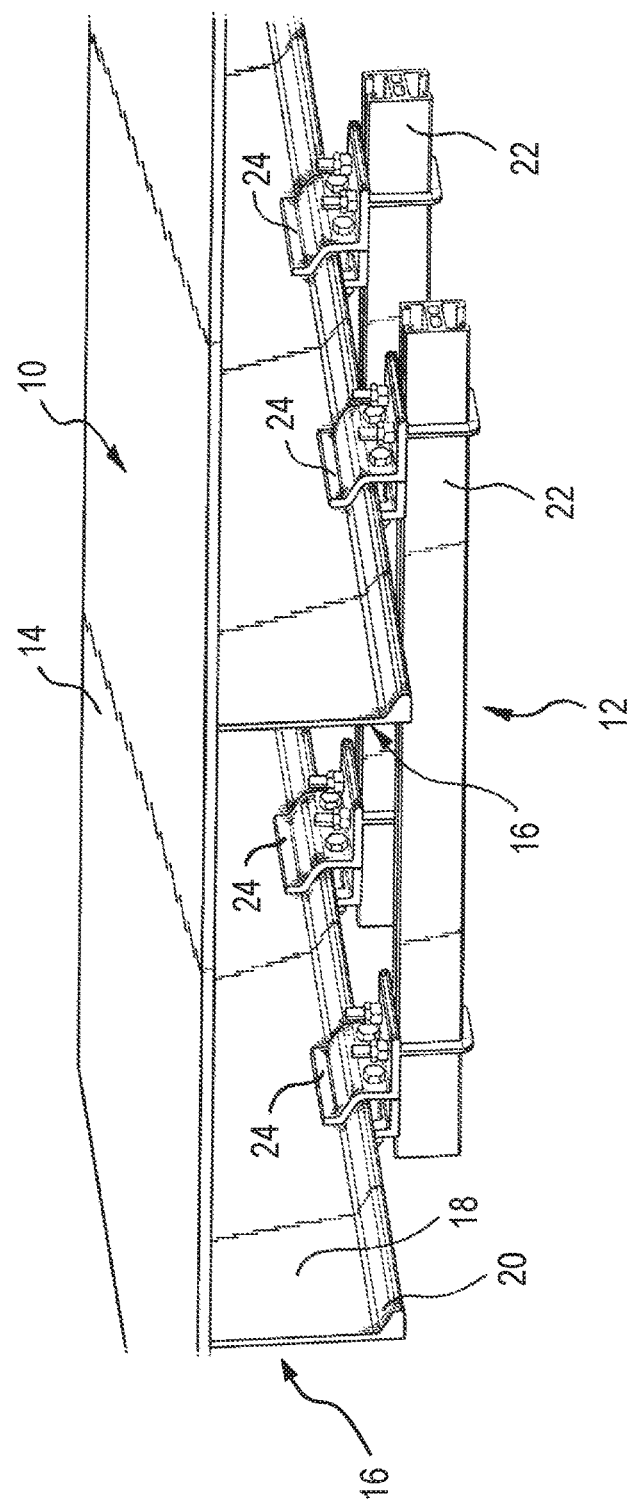
FIG. 1 shows a floor structure from which utility support apparatus according to the present invention is suspended.

A floor structure 10 from which utility support apparatus 12 according to the present invention is suspended is shown in FIG. 1. The floor structure 10 comprises a deck plate 14 which is reinforced against bending by two parallel spaced apart beams 16. Each beam 16 comprises a rectangular planar member 18 that is attached, such as by welding, at its proximal end to the underside of the deck plate 14 and a bulb 20 which extends at a distal end of the planar member 18 from one side only of the planar member 18. The form of the bulb 20 is described below in more detail with reference to FIG. 2. The utility support apparatus 12 comprises two parallel spaced apart elongate support members 22. Each elongate support member 22 is formed from extruded aluminium. Although not shown in FIG. 1, the utility support apparatus 12 further comprises a cable tray of known form and function. The cable tray is placed so it is supported on the two elongate support members 22. In use, utility distribution elements such as electrical cables and ducts for conveying the like of water and gas are placed in the cable tray. The utility support apparatus 12 is therefore operative to support and contain the utility distribution elements in the space underneath the deck plate 14. Each elongate support member 22 is attached at spaced apart locations on the elongate support member to the beams 16 by way of a pair of spaced apart clamping arrangements 24. The clamping arrangements 24 are described in detail below with reference to FIGS. 2 and 3.

Although the utility support apparatus 12 is shown in FIG. 1 as forming part of a floor structure the utility support apparatus 12 also forms part of other structures such as ceiling structures. When the utility support apparatus 12 is suspended from an overhead structure, such as a ceiling, the elongate support members 22 are attached to beams 16 used to reinforce the overhead structure in the same fashion as described above for the floor structure. Otherwise an overhead structure suspended utility support apparatus 12 is operative to support a cable tray as described above.

Figure 2:
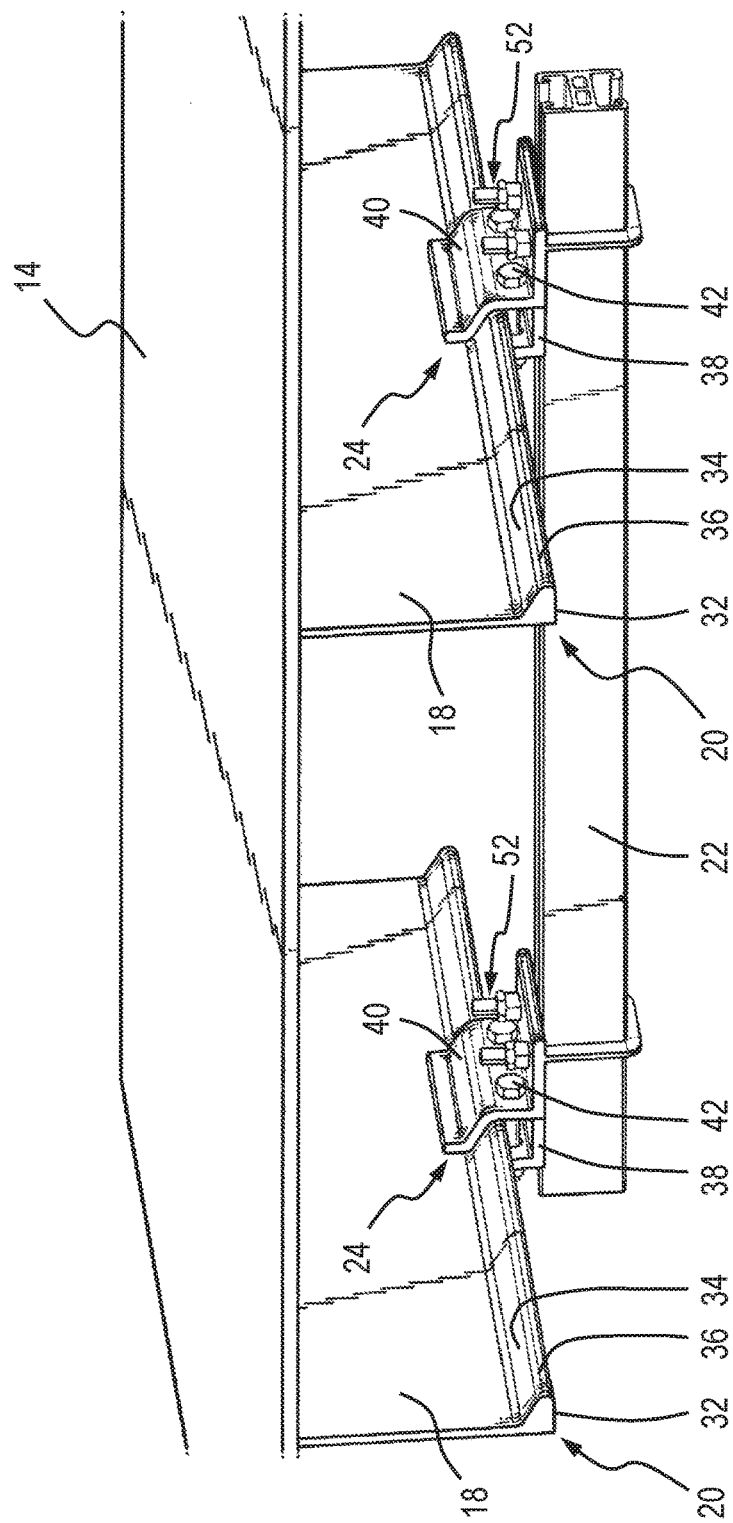
FIG. 2 shows two clamping arrangements according to the present invention which support a structural component.
Figure 3:
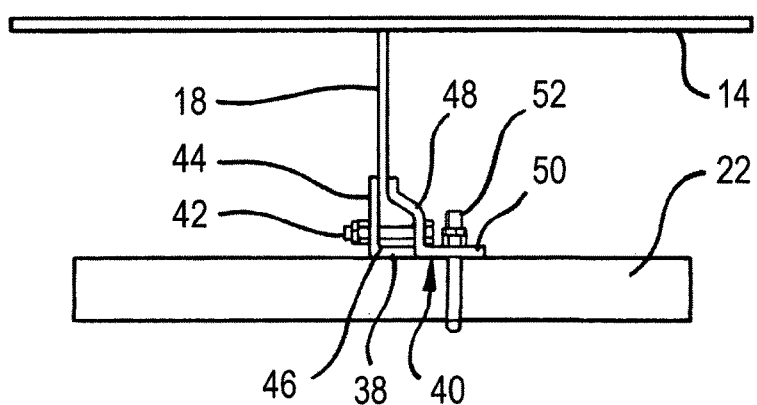
FIG. 3 is a view in cross-section of a clamping arrangement according to the present invention.

FIG. 2 shows two clamping arrangements 24 according to the present invention which support an elongate support member 22 (which constitutes a structural component). A single clamping arrangement 24 is shown in FIG. 3 in cross-section. Components in common with the arrangement shown in FIG. 1 are designated in FIGS. 2 and 3 with like reference numerals. Considering the bulb 20 at the distal end of the planar member 18 in more detail, the bulb is shaped so it defines a sole surface 32 which is substantially perpendicular to the planar member 18, an oblique surface 34 and a rounded surface 36 between the sole surface 32 and the oblique surface 34. Each clamping arrangement comprises a first clamping part 38, a second clamping part 40 and an actuating arrangement 42. The actuating arrangement 42 comprises two bolts (each of which constitutes a threaded arrangement with a flange) and two nuts (each of which constitutes a threaded fastener).

The first clamping part 38 comprises a first member 44 and a second member 46 which are each planar in form and extend orthogonally of each other from adjacent edges. The first clamping part 38 is formed by shaping sheet metal, such as aluminium. The first member 44 defines two spaced apart bores for receiving the actuating arrangement 42 as is described further below. In use, as shown in FIGS. 2 and 3, a surface of the first member 44 which defines in part the 90 degree angle defined by the first and second members abuts against the face of the planar member 18 directed away from the bulb 20. The second member 46 extends underneath and spaced apart from the sole surface 32 and such that it extends substantially parallel to the sole surface 32.

The second clamping part 40 comprises a first member 48 and a second member 50. The first member 48 defines a planar surface and a rounded surface between the planar surface and the oblique surface. Two spaced apart bores are defined in the part of the first member 48 that defines the planar surface with the spacing being substantially the same as the spacing between the two bores defined in the first member 44 of the first clamping part 38. The first member 48 comprises a planar lip which extends from the part of the second clamping part that defines the oblique surface. The lip extends in a direction parallel to the planar surface of the first member 48. The second member 50 is planar and extends in a direction substantially perpendicular to the planar surface defined by the first member 48 of the second clamping part 40 and in a direction away from the direction in which the first member 48 curves by way of the part defining the rounded surface. The second member 50 defines two spaced apart bores for receiving the attachment arrangement described below. The second clamping part 40 is formed by shaping sheet metal, such as aluminium.

The clamping arrangement is brought into use by disposing the first and second clamping parts 38, 40 on opposite sides of the planar member 18 such that the bores of the first and second clamping parts are in registration with each other. A first one of the bolts is pushed through one of the bores formed in the part of the first member 48 of the second clamping part 40 that defines the planar surface and then through a corresponding one of the bores formed in the first member 44 of the first clamping part 38. The second one of the bolts is then pushed through the other one of the bores formed in the part of the first member 48 of the second clamping part 40 that defines the planar surface and through the corresponding other one of the bores formed in the first member 44 of the first clamping part 38. Each bolt extends through the space between the sole surface 32 and the upper surface of the second member 46 of the first clamping part 38.

A nut is then threaded on each bolt and the nuts tightened on their respect bolts with the nut bearing against the first clamping part 38 and the bolt head bearing against the second clamping part 40 to thereby urge the first and second clamping parts together. As the first and second clamping parts 38, 40 are moved together on opposite sides of the beam 16, the first member 44 of the first clamping part 38 bears against one side of the planar member 18 and the second clamping part 40 bears against the other side of the planar member 18 from which the bulb 20 extends. As can be seen from FIGS. 2 and 3, the oblique surface of the second clamping part 40 bears against the oblique surface of the bulb 20 and part of the rounded surface of the second clamping part 40 bears against part of the rounded surface of the bulb 20. Furthermore the relative dimensions of the first and second clamping parts 38, 40 is such that a surface of the second member of the second clamping part 40 and a surface of the second member of the first clamping part 38 which are oriented away from the beam 16 clamped between the first and second clamping parts lie in substantially the same plane.

The clamping arrangement 24 further comprises an attachment arrangement 52. The attachment arrangement 52 comprises an elongate member which is formed to have a symmetrical U-shape. The exterior surface of each end of the elongate member is threaded. The elongate member is brought into use by being disposed underneath the elongate support member 22 such that the threaded ends are oriented towards the deck plate 14. The threaded ends are then passed through respective bores formed in the second member 50 of the second clamping part 40 and a nut is threadedly engaged with each threaded end protruding through the second member 50. The nuts are then tightened on the threaded ends whereby the elongate support member 22 is borne on the base of the U-shape formed by the elongate member and is held firmly between the base of the U-shape formed by the elongate member and the surface of the clamping arrangement oriented away from the deck plate 14.

The above described process is repeated for the other clamping arrangement 24 in the pair of clamping arrangements and for each clamping arrangement 24 in further pairs of clamping arrangements whereby plural spaced apart elongate support members 22 are supported by the deck plate 14. As described above a cable tray is placed so it is supported on the suspended elongate support members 22. As described above, when the utility support apparatus 12 is suspended from an overhead structure, such as a ceiling, the clamping arrangements 24 are clamped to beams attached to the overhead structure in the same fashion as described above for the floor structure.

The invention claimed is:

1. A structural arrangement comprising a structural member and a clamping arrangement for attaching a support member to the structural member, wherein the structural member comprises a planar part defined between first and second substantially parallel faces and a bulb extending outwardly from the first substantially parallel face so that the bulb is only on one side of the planar part, the bulb defining a sole surface substantially orthogonal to the planar part, an oblique surface and a rounded surface between the sole surface and the oblique surface, wherein the clamping arrangement comprises:

a first clamping part comprising a first member and a second member, the first and second members extending substantially orthogonal to each other, the first member abutting against the second substantially parallel face of the planar part directed away from the bulb and the second member extending underneath the sole surface between the first member and a distal end of the second member, the second member being entirely spaced apart from the sole surface;

a second clamping part separate from the first clamping part, the second clamping part defining an oblique surface which abuts against the oblique surface of the bulb; and a clamp fastener urging the separate first and second clamping parts bodily towards each other in a direction substantially orthogonal to the planar part to thereby clamp the structural member therebetween, wherein the distal end of the second member bears against the second clamping part when the structural member is clamped between the first and second clamping parts.

2. The structural arrangement of claim 1, wherein the clamp fastener comprises an elongate member which is configured to bear against each of the first and second clamping parts at respective spaced apart locations on the elongate member whereby the first and second clamping parts are urged towards each other to clamp the structural member therebetween.

3. The structural arrangement of claim 2, wherein the elongate member extends underneath the sole surface of the bulb between the first and second clamping parts and substantially parallel to the sole surface.

4. The structural arrangement of claim 3, wherein the elongate member is between the sole surface of the bulb and the second member of the first clamping part as the elongate member extends underneath the sole surface.

5. The structural arrangement of claim 2, wherein the elongate member extends from beyond the rounded surface of the bulb to beyond the second substantially parallel face of the planar part directed away from the bulb.

6. The structural arrangement of claim 2, wherein the elongate member comprises a flange which bears against one of the first and second clamping parts whereby the one of the first and second clamping parts is urged towards another of the first and second clamping parts.

7. The structural arrangement of claim 2, wherein the elongate member has a threaded portion along at least part of its length and the clamp fastener further comprises a threaded fastener which threadedly engages with the threaded portion, the threaded fastener bearing against one of the first and second clamping parts whereby the one of the first and second clamping parts is urged progressively towards another of the first and second clamping parts as the threaded fastener moves along the threaded portion.

8. The structural arrangement of claim 2, wherein the elongate member is received through a bore defined by each of the first and second clamping parts, the elongate member being configured to bear against each of the first and second clamping parts at the bore defined by each of the first and second clamping parts.

9. The structural arrangement of claim 8, wherein the second clamping part defines a planar surface, and a rounded surface between the planar surface and the oblique surface of the second clamping part, the bore defined by second clamping part being defined in the planar surface and the bore defined by first clamping part being defined in the first member of the first clamping part.

10. The structural arrangement of claim 1, wherein each of the first and second clamping parts is substantially rigid.

11. The structural arrangement of claim 1, wherein the second clamping part comprises first and second members, the first member of the second clamping part defining the oblique surface of the second clamping part and the second member of the second clamping part extending in a direction substantially orthogonal to the planar part and away from the first clamping part.

12. The structural arrangement of claim 11 comprising a support attachment member which is configured to releasably couple the second member of the second clamping part to the support member whereby the clamping arrangement is releasably coupled to the support member.

13. The structural arrangement of claim 12 wherein the support attachment member defines a cradle for supporting the support member.

14. The structural arrangement of claim 13 wherein the support attachment member comprises a threaded portion at each side of the cradle, each threaded portion mechanically engaging with the second member of the second clamping part.

15. The structural arrangement of claim 12 wherein the support attachment member comprises a support elongate member, the support elongate member being received through a bore defined in the second member of the second clamping part.

16. The structural arrangement of claim 15 wherein the support attachment member further comprises a support threaded fastener, wherein the support attachment member is supported on the second member of the second clamping member by threaded engagement between the support threaded fastener and a threaded end of the support elongate member.

17. The structural arrangement of claim 1 in which the structural member is a beam.

18. Utility support apparatus comprising the structural arrangement of claim 1 and a support member attached to the second clamping part.

19. The structural arrangement of claim 1 wherein the second member of the first clamping member is completely planar.

20. The structural arrangement of claim 1 wherein there is no contact between the second member of the first clamping member and the sole surface when the structural member is clamped between the first and second clamping parts.

* * * * *